US008427738B2

(12) United States Patent
Stievater et al.

(10) Patent No.: US 8,427,738 B2
(45) Date of Patent: Apr. 23, 2013

(54) NONLINEAR FREQUENCY CONVERSION IN NANOSLOT OPTICAL WAVEGUIDES

(75) Inventors: Todd H. Stievater, Arlington, VA (US); Jacob B. Khurgin, Pikesville, MD (US); Doewon Park, Herndon, VA (US); Marcel W. Pruessner, Silver Spring, MD (US); William S. Rabinovich, Silver Spring, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 312 days.

(21) Appl. No.: 12/901,159

(22) Filed: Oct. 8, 2010

(65) Prior Publication Data

US 2011/0188112 A1 Aug. 4, 2011

Related U.S. Application Data

(63) Continuation-in-part of application No. 12/880,922, filed on Sep. 13, 2010, now abandoned.

(60) Provisional application No. 61/241,723, filed on Sep. 11, 2009.

(51) Int. Cl.
*G02F 2/02* (2006.01)
(52) U.S. Cl.
USPC .......................... 359/332; 359/330; 385/131
(58) Field of Classification Search .................... 359/332
See application file for complete search history.

(56) References Cited

U.S. PATENT DOCUMENTS

| 3,962,716 | A | 6/1976 | Petroff et al. |
| 5,434,700 | A * | 7/1995 | Yoo ................................ 359/332 |
| 6,940,639 | B1 * | 9/2005 | Belyanin et al. .............. 359/330 |
| 7,673,517 | B2 | 3/2010 | Stievater et al. |
| 2007/0104443 | A1 * | 5/2007 | Helmy ............................ 385/129 |
| 2007/0125150 | A1 | 6/2007 | Stievater et al. |
| 2010/0139406 | A1 | 6/2010 | Stievater et al. |
| 2010/0238454 | A1 | 9/2010 | Pruessner et al. |
| 2011/0188112 | A1 | 8/2011 | Stievater et al. |

OTHER PUBLICATIONS

Denzer, W., Hancock, W., Hutchinson, A., Munday M., Peverall R., and Ritchie, G.A.D., "Mid-infrared generation and spectroscopy with a PPLN ridge waveguide", Applied Physics B: Lasers and Optics, vol. 86, No. 3, pp. 437-441, 2006.

De Sande J. C. G., Leo G., and Assanto G., "Phase-Matching Engineering in Birefringent AlGaAs Waveguides for Difference Frequency Generation", Journal of Lightwave Technology, vol. 20, Issue 4, pp. 651-660, (Apr. 2002).

Di Falco A., Conti C., and Assanto G., "Quadratic phase matching in slot waveguides", Optics Letters, vol. 31, Issue 21, pp. 3146-3148 (Oct. 11, 2006).

(Continued)

*Primary Examiner* — Hemang Sanghavi
(74) *Attorney, Agent, or Firm* — Amy Ressing; Sally A. Ressing (57) ABSTRACT

A waveguide device for frequency mixing or conversion through birefringent phase matching, having two suspended horizontal waveguides with an air-filled horizontal nanoslot between them. The waveguides are formed of a material with a high nonlinear susceptibility, and one waveguide can be n-doped with the other waveguide slab being p-doped. The system can be tuned to operate at different frequencies by varying the nanoslot gap distance by electrostatically actuating the suspended air-clad waveguides.

26 Claims, 6 Drawing Sheets

OTHER PUBLICATIONS

Durand O., Wyckzisk F., Olivier J., Magis M., Galtier P., De Rossi A., Calligaro M., Ortiz V., Berger V., Leo G., and Assanto G., "Contraction of aluminum oxide thin layers in optical heterostructures", Appl. Phys. Lett., vol. 83, pp. 2554-2556 (2003).

Fiore A., Berger V., Rosencher E., Laurent N., Theilmann S., Vodjdani N., and Nagle J., "Huge birefringence in selectively oxidized GaAs/AlAs optical waveguides", Appl. Phys. Lett., vol. 68, pp. 1320-1322 (1996).

Fiore A., Berger V., Rosencher E., Bravetti P., Laurent N., and Nagle J., "Phase-matched mid-infrared difference frequency generation in GaAs-based waveguides", Appl. Phys. Lett., vol. 71, pp. 3622-3624, (1997).

Fiore A., Janz S., Delobel L., Van Der Meer P., Bravetti P., Berger V., Rosencher E., and Nagle J., "Second-harmonic generation at $\lambda=1.6$ µm in AlGaAs/Al2O3 waveguides using birefringence phase matching", Appl. Phys. Lett., vol. 72, pp. 2942-2945 (1998).

Fiore A., Berger V., Rosencher E., Bravetti P. and Nagle J., "Phase matching using an isotropic nonlinear optical material", Nature, Vol. 391, pp. 463-466, Jan. 1998.

Holmstrom S. A., Stievater T. H., Pruessner M. W., Rabinovich W. S., Kanakaraju S., Calhoun L. C., Khurgin J. B., Kelly D. P., and Ghodssi R., "Spontaneous Raman Scattering in Suspended InGaAsP Waveguides," Conference on Lasers and Electro-Optics/International Quantum Electronics Conference, OSA Technical Digest (CD) (Optical Society of America, 2009), paper CThV6, Jun. 2-4, 2009, pp. 1-2.

Ishikawa, H. and Kondo, T., "Birefringent Phase Matching in Thin Rectangular High-Index-Contrast Waveguides", Applied Physics Express, vol. 2, No. 2009, pp. 042202-1-042202-3, published online Apr. 3, 2009.

Kelly D.P., Pruessner M.W., Amarnath K., Datta M., Kanakaraju S., Calhoun L.C., Ghodssi R., "Monolithic suspended optical waveguides for InP MEMS", Photonics Technology Letters, IEEE, May 2004, vol. 15, No. 5, pp. 1298-1300, May 2004.

Khurgin J.B., Pruessner M. W., Stievater T. H., and Rabinovich W. S., "Suspended AlGaAs waveguides for tunable difference frequency generation in mid-infrared", Optics Letters, vol. 33, No. 24, pp. 2904-2906 (2008).

Khurgin J.B., Stievater T. H., Pruessner M. W., and Rabinovich W. S., "Design of Suspended AlGaAs waveguides for tunable difference frequency generation in mid-infrared", OSA/CLEO/IQEC, paper CFR1, pp. 1-3, (2009).

Kuo P. S., Vodopyanov K. L., Fejer M. M., Simanovskii D. M., Yu X., Harris J. S., Bliss D. and Weyburne D., "Optical parametric generation of a mid-infrared continuum in orientation-patterned GaAs", Optics Letters, vol. 31, Issue 1, pp. 71-73 (2006).

Stievater T. H., Rabinovich W. S., Park D., Khurgin J. B., Kanakaraju S., and Richardson C. J. K., "Low-loss suspended quantum well waveguides", Optics Express, vol. 16, No. 4, pp. 2621-2627 (Feb. 11, 2008).

Stievater T. H., Park D., Rabinovich W. S., Pruessner M. W., Kanakaraju S., Richardson C. J., and Khurgin J. B., "Enhanced electro-optic phase shifts in suspended waveguides," Opt. Express, vol. 18, p. 885-892, Jan. 6, 2010.

Siviloglou G.A., Suntsov S., El-Ganainy R., Iwanow R., Stegeman G.I., Christodoulides D.N., Morandotti R., Modotto D., Locatelli A., De Angelis C., Pozzi F., Stanley C. R., and Sore M., "Enhanced third-order nonlinear effects in optical AlGaAs nanowires", Optics Express, vol. 14, Issue 20, pp. 9377-9384 (2006).

Xu Q., Almeida V.R., Panepucci R. R., and Lipson M., "Experimental demonstration of guiding and confining light in nanometer-size low-refractive-index material", Optics Letters, vol. 29, Issue 14, pp. 1626-1628 (Jul. 15, 2004).

Yang A.H. J., Moore S.D., Schmidt B.S., Klug M., Lipson M., and Erickson D., "Optical manipulation of nanoparticles and biomolecules in sub-wavelength slot waveguides", Nature, vol. 457, pp. 71-75 (Jan. 1, 2009).

Yang S.H., Cooper M.L., Bandaru P.R., and Mookherjea S., "Giant birefringence in multi-slotted silicon nanophotonic waveguides" Optics Express, vol. 16, Issue 11, pp. 8306-8316 (May 22, 2008).

Yoo H.G., Fu Y., Riley D., Shin J.H., and Fauchet P.M., "Birefringence and optical power confinement in horizontal multi-slot waveguides made of Si and SiO2", Optics Express, vol. 16, Issue 12, pp. 8623-8628 (2008).

Yu X., Scaccabarozzi L., Harris Jr. J. S., Kuo P. S., and Fejer M. M., "Efficient continuous wave second harmonic generation pumped at 1.55 µm in quasi-phase-matched AlGaAs waveguides" Optics Express, vol. 13, Issue 26, pp. 10742-10748 (2005).

* cited by examiner

NONLINEAR FREQUENCY CONVERSION IN NANOSLOT OPTICAL WAVEGUIDES

CROSS-REFERENCE TO RELATED APPLICATIONS

This application is continuation in part of U.S. patent application Ser. No. 12/880,922, filed on Sep. 13, 2010, which is a non-provisional under 35 USC 119(e) of, and claimed the benefit of, U.S. Provisional Application 61/241,723, filed on Sep. 11, 2009, the entire disclosures of each of which are incorporated herein by reference.

BACKGROUND OF THE INVENTION

1. Technical Field

The invention relates to optical waveguides in general and particularly to optical waveguides that employ materials having large nonlinear optical characteristics.

2. Related Technology

Integrated nonlinear devices have been sought for frequency conversion, particularly to generate optical radiation at wavelengths that are not readily generated by presently available laser devices.

Group III-V semiconductors that crystallize in a zinc blende lattice possess a large second-order nonlinear susceptibility, in excess of 100 pm/V. This quality, and their wide use in active optoelectronic devices have made III-V materials of interest for integrated nonlinear devices for frequency conversion.

Second-order nonlinear processes require phase matching between the three waves involved. One technique for phase matching involves the optical anisotropy of nonlinear crystals, a technique usually referred to as birefringent phase matching (BPM). However, bulk zinc blende materials are optically isotropic, which makes them not useful for BPM.

An alternative technique called quasi-phase matching (QPM) has also been widely investigated. QPM involves periodically inverting the sign of the nonlinear susceptibility. QPM is well-established in ferroelectric materials, such as lithium niobate. However, QPM in III-V semiconductors such as GaAs requires complex technologies and faces severe material problems, including waveguide loss. For additional discussion, see J. B. Khurgin, M. W. Pruessner, T. H. Stievater, and W. S. Rabinovich, "Suspended AlGaAs waveguides for tunable difference frequency generation in mid-infrared", Optics Letters, Vol. 33, No. 24, pp. 2904-2906 (2008) and W. Denzer et al., "Mid-infrared generation and spectroscopy with a PPLN ridge waveguide", Applied Physics B: Lasers and Optics, Vol. 86, No. 3, pp. 437-441, 2006.

Another approach to phase-matching is to take advantage of the artificial, or "form", birefringence that can be attained in waveguides between orthogonally polarized modes. This approach may work in standard GaAs waveguides for as long as only relatively long wavelength photons (mid-IR) are involved in the process. However, the material dispersion becomes too large to be compensated by the form birefringence in applications using near-IR sources.

By the 1990s it had been found that that the relatively weak birefringence in typical $Al_xGa_{1-x}As$ waveguides, in which the cladding and core differ slightly in composition, could be greatly enhanced if layers of $Al_2O_3$ with a small refractive index are introduced between the $Al_xGa_{1-x}As$ layers via selective oxidation. Further discussion is found in A. Fiore et al., "Huge birefringence in selectively oxidized GaAs/AlAs optical waveguides", Appl. Phys. Lett., Vol. 68, pp. 1320-22, (1996) and A. Fiore et al., "Phase-matched mid-infrared difference frequency generation in GaAs-based waveguides", Appl. Phys. Lett., Vol. 71, pp. 3622-24, (1997).

A. Fiore et al., "Second-harmonic generation at $\lambda=1.6$ μm in AlGaAs/Al2O3 waveguides using birefringence phase matching", Appl. Phys. Lett., Vol. 72, pp. 2942 (1998), describes second harmonic generation using birefringence phase matching. A. Fiore et al., "Phase matching using an isotropic nonlinear optical material", Nature, Vol. 391, pp. 463-466, January 1998 describes difference frequency generation using this technique. A theoretical discussion is found in J. C. G. de Sande et al., "Phase-Matching Engineering in Birefringent AlGaAs Waveguides for Difference Frequency Generation", Journal of Lightwave Technology, Vol. 20, Issue 4, pp. 651-660, (April 2002).

This technique has several challenges. First, O. Durand et al., "Contraction of aluminum oxide thin layers in optical heterostructures", Appl. Phys. Lett., Vol. 83, pp. 2554 (2003) describes that wet oxidation of AlAs generally results in small grain poly-$Al_2O_3$ embedded in the AlAs matrix, which results in a composite $AlAs/Al_2O_3$ layer, and that the oxidation can result in a significant shrinkage of the layer thickness. In addition, A. Fiore et al., "Phase-matched mid-infrared difference frequency generation in GaAs-based waveguides", Appl. Phys. Lett., Vol. 71, pp. 3622 (1997) describes that the tunability of the device is limited to about 50 $cm^{-1}$ using temperature tuning.

BRIEF SUMMARY OF THE INVENTION

An aspect of the invention is a birefringence phase matching optical semiconductor device for generating optical pulses, the device having a substrate, a first waveguide slab suspended at opposite ends of the slabs at a first distance from the substrate, and a second waveguide slab suspended at opposite ends at a second distance from the substrate, the second waveguide slab parallel to and spaced apart from the first waveguide slab, both the first waveguide slab and the second waveguide formed of a material with a nonzero nonlinear susceptibility.

The type III-V material with a large nonlinear susceptibility can be AlGaAs, GaAs, GaP, AlAs, or AlGaAsP. The substrate can be GaAs, GaSb, or InP. The waveguide slab can be n-doped or p-doped and the second waveguide slab can be doped oppositely to the first waveguide, and in operation, responsive to a voltage applied across the waveguide slabs, the distance between the first waveguide slab and the second waveguide slab changes.

An air gap can be located between parallel faces of the first waveguide slab and the second waveguide slab, and a larger air gap can be located between the second waveguide slab and the substrate.

Support elements can be arranged between the first waveguide slab and the second waveguide slab, and additional support elements can be arranged between the second waveguide slab and the substrate at each lateral end of the waveguide slabs. The first waveguide slab can have a longitudinal ridge on the top surface of the first waveguide slab extending in the longitudinal direction. The ridge has a width in a lateral direction at least as wide as its height in a vertical direction. A series of openings in the first waveguide slab and the second waveguide slab can be arranged on either side of the ridge.

Another aspect of the invention is directed to a birefringence phase matching semiconductor optical device including an n-doped first waveguide slab formed of a material having a high nonlinear susceptibility, and a p-doped second waveguide slab formed of a material having a high nonlinear susceptibility, the second waveguide slab arranged parallel to the first waveguide slab, the waveguide slabs being supported at each end by a support element arranged at lateral ends of the waveguide slabs, wherein said support elements are formed of a material having a low nonlinear susceptibility, and wherein a center portion of the first waveguide slab is separated from a center portion of the second waveguide slab by a cavity. The cavity can be formed by etching away a sacrificial layer between the waveguide slabs during manufacture.

Another aspect of the invention is directed to a method for generating an output optical signal with a birefringence phase matching optical waveguide device, the optical waveguide device having a first waveguide slab formed of a material having a high nonlinear susceptibility, a second waveguide slab formed of a material having a high nonlinear susceptibility, the second waveguide slab arranged parallel to the first waveguide slab, the waveguide slabs being supported at each end by a support element arranged at lateral ends of the waveguide slabs, a center portion of the first waveguide slab being separated from a center portion of the second waveguide slab by a cavity. The method includes receiving a first optical signal at a first wavelength at an end of the waveguide slabs, receiving a second optical signal at a second wavelength at the end of the waveguide slabs, and optically mixing the first optical signal and the second optical signal to produce an output optical signal at a different wavelength at an opposite end of the waveguide slabs.

The first waveguide slab can be n-doped, the second waveguide slab can be p-doped, with the method also including changing the distance between the first waveguide slab and the second waveguide slab by applying a voltage between the first waveguide slab and the second waveguide slab to electrostatically actuate the waveguide slabs.

Additional features will be apparent from the drawings and following detailed description.

DETAILED DESCRIPTION OF EMBODIMENTS OF THE INVENTION

Devices in accordance with this invention include nanomachined type III-V semiconductor materials configured to produce low loss slotted waveguides that use form birefringence phase matching.

There are four factors that make suspended waveguides a good technique for frequency conversion. First of all, the huge difference between the TM and TE effective indices of $Al_x Ga_{1-x}$ As causes giant form birefringence and greatly expands the phase-matching region practically throughout the entire IR region. Second, the tight confinement of radiation in the ridge suspended air-cladding waveguides can enhance the conversion efficiency. Third, epitaxial growth provides extremely smooth horizontal surfaces, enabling low-loss propagation in slabs that are thinner than the material wavelengths without a critical dependence on smooth sidewalls. Finally, as described below, a new tuning technique can be implemented if the width of the air gap between two suspended waveguides can be varied.

Figure 1A:
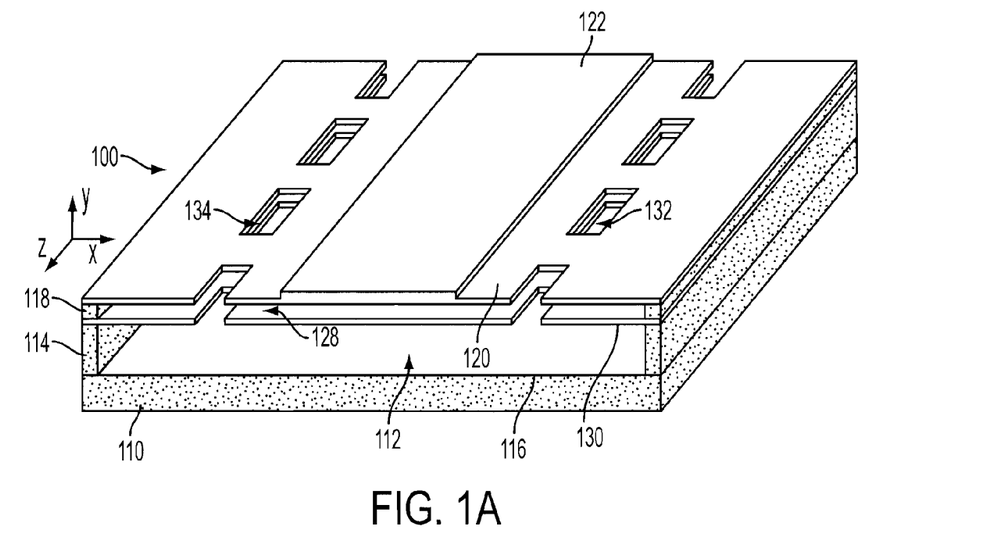
FIGS. 1A, 1B, and 1C illustrate a low-loss suspended nanoslot waveguide device in accordance with an embodiment of the invention.
Figure 1B:
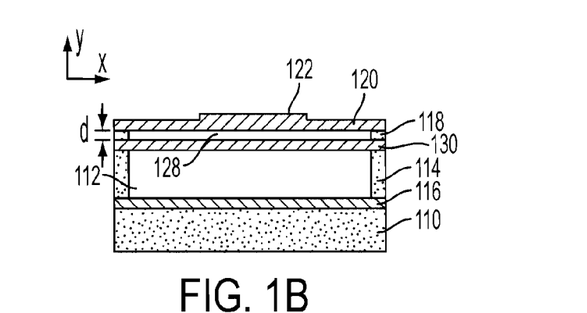
Figure 1C:
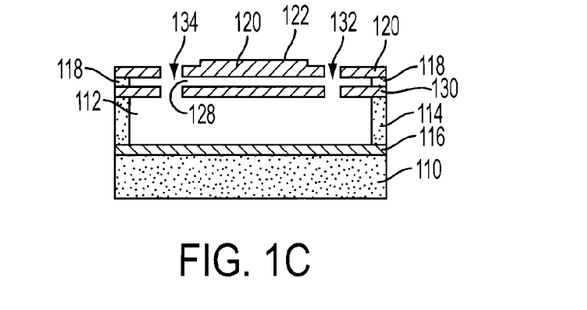

FIGS. 1A, 1B, and 1C illustrate an example of a low-loss suspended nanoslot waveguide device in an accordance with an embodiment of the invention. This integrated non-linear device is useful for frequency conversion, particularly for generating optical pulses at wavelengths that are not readily generated by presently available laser devices. Note that the figures herein are not to scale, in order to adequately show details of the devices.

The waveguide has two suspended waveguide layers or slabs 120 and 130 arranged parallel to each other and separated by an air gap 128. This air gap 128, or horizontal nanoslot, has a very small vertical dimension between the two slabs. The waveguide slabs are supported at their lateral ends by supports 118 between the waveguide slabs, and are suspended above a semiconductor substrate 110 by supports 114. The supports 114 maintain the slabs 120 and 130 at a distance from the substrate that is much larger than the vertical distance "d" between the two slabs.

A ridge 122 extends from the top waveguide slab 120 along the length of the waveguide slab 120 in the longitudinal z direction, and is intended to provide lateral confinement of the optical modes.

A series of etch holes 132, 134 in the waveguide slabs 120 and 130 extend along the longitudinal dimension. In this example, the etch holes 132, 134 are located on both lateral sides of the ridge 122. Only a few etch holes are shown in FIG. 1A for convenience.

The air gap, or nanoslot, 128 has a vertical distance between the two waveguide slabs of about 100 nm. The waveguide slab 130 that is closest to the substrate 110 has a thickness in the vertical dimension of about 130 nm. The waveguide slab 120 has a vertical thickness of about 135 nm, and the ridge 122 extends vertically above the surface of the waveguide slab 120 by about 90 nm. The ridge has a lateral width of approximately 1000 nm. The length of the waveguides along the longitudinal z direction is approximately 1 mm or longer.

The length of the waveguide slabs in the longitudinal direction should be sufficient for good beam interaction, and is typically at least about one millimeter. The length of the waveguide device will depend on the nonlinear susceptibility of the waveguide material. Materials with smaller nonlinear susceptibilities will require longer beam interaction distance, and therefore, a longer waveguide dimension.

It is preferred that the air gap distance between the bottom waveguide slab 130 and the substrate 110 should allow only a small amount, if any, of beam interaction with the substrate. A suitable distance is at least about the same as the wavelength of the incoming laser light. For example, for a 1550 nm laser, the air gap between the bottom waveguide and the semiconductor substrate should be at least about 1500 nm.

Each of the waveguide slabs 120, 130 is several times wider (in the x direction perpendicular to the waveguide slab face)

between the etch holes than it is thick (in the y-direction perpendicular to the waveguide slab face), and several times wider than the distance between the waveguide slabs. This configuration allows the TE mode to "see" an effective index closer to 1, and the TM mode to "see" an effective index of refraction closer to that of the waveguide slab material.

In this example, the waveguide slabs 120, 130 are AlGaAsP, the substrate 110 is GaAs, the supports 114 and 118 are GaAs, and the etch stop layer 116 is InGaAs(P). As will be discussed in later paragraphs, the waveguide slabs 120 and 130 can be oppositely doped, with one slab being n-doped and the other slab being p-doped, so the slabs can be electrostatically actuated by applying a voltage between the slabs. The electrostatic actuation decreases the vertical distance between the waveguide slabs.

A cross sectional view of the device 100 is shown in FIG. 1B, and a cross sectional view through the etch holes 132, 134 is shown in FIG. 1C.

A cross sectional view of the waveguide 100 through a pair of the etch holes is shown in FIG. 1C. The etch holes 132, 134 extend through both of the waveguide slabs.

FIG. 2A-2D illustrate a method for forming the waveguide 100. A sacrificial layer of GaAs is grown on the GaAs substrate, with an etch stop layer of AlGaAs between the GaAs substrate and the sacrificial GaAs layer. A slab of $Al_{0.5}Ga_{0.5}As_{0.96}P_{0.04}$ is grown on the GaAs sacrificial layer. Another sacrificial layer of GaAs is formed on the slab of $Al_{0.5}Ga_{0.5}As_{0.96}P_{0.04}$, followed by another layer of $Al_{0.5}Ga_{0.5}As_{0.96}P_{0.04}$. The epitaxial growth of the $Al_{0.5}Ga_{0.5}As_{0.96}P_{0.04}$ layers can produce extremely smooth horizontal surfaces, resulting in low loss propagation in slabs that are thinner than the material wavelengths without a critical dependence on smooth sidewalls.

Figure 2A:
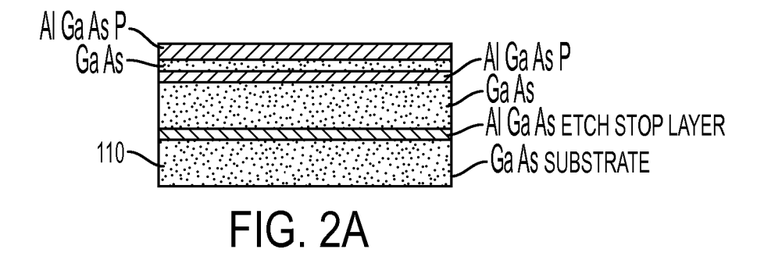
FIG. 2 illustrates a method for forming the waveguide device of FIGS. 1A, 1B, and 1C.

One of the $Al_{0.5}Ga_{0.5}As_{0.96}P_{0.04}$ slabs can be lightly n-doped, and the other $Al_{0.5}Ga_{0.5}As_{0.96}P_{0.04}$ slab can be lightly p-doped. The sacrificial GaAs layer that forms the lateral supports 118 between the waveguide slabs are preferably not doped, so the waveguides and lateral support elements form a p-i-n diode for electrostatic actuation. Note that if electrostatic actuation is not desired, it is not necessary to n- and p-dope the waveguide slabs.

Figure 2B:
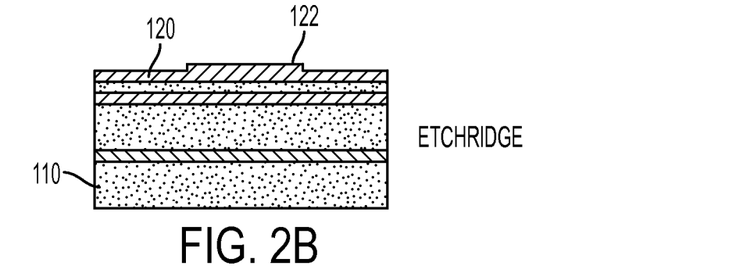

The ridge 122 can be patterned and etched in the top layer 120 of $Al_{0.5}Ga_{0.5}As_{0.96}P_{0.04}$, as seen in FIG. 2B.

Figure 2C:
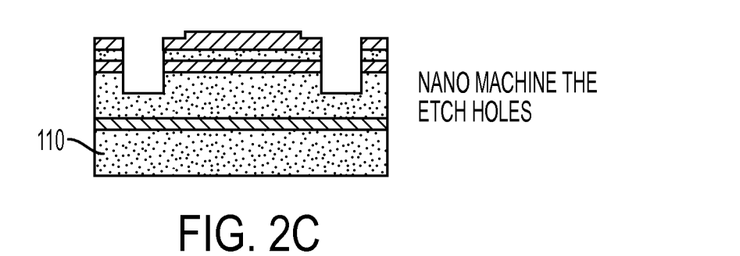

A pattern of etch holes 132 and 134 can be formed using electron beam lithography followed by a chlorine-based inductively coupled plasma (ICP) etch, as seen in FIG. 2C.

Figure 2D:
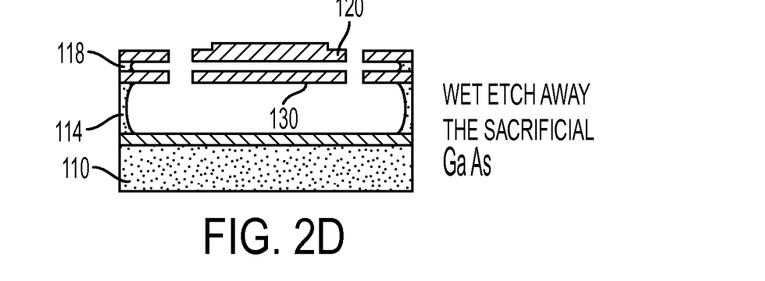

A wet etch can be used to remove the sacrificial GaAs layers, suspending the slab waveguides with a narrow horizontal nanoslot 128 between the slabs, and a larger air gap 112 between the lower of the slabs 130 and the substrate 110. The side portions of the GaAs sacrificial layer that remain after the wet etch will form supports 114 and 118 that support the lateral edges of the two AlGaAsP waveguide slabs 120 and 130, as seen in FIG. 2D.

The small amount of phosphorous in the AlGaAs waveguide slabs makes them tensile with respect to the supports and the substrate, reducing the likelihood that the suspended waveguide slabs will crack or buckle upon release from the sacrificial layer, and ensuring flatness upon release.

Referring again to FIG. 1, in operation, a signal at a first wavelength $\lambda_1$ and a second signal at a second wavelength $\lambda_2$ are incident at one longitudinal end of the waveguide 100. A third optical pulse at a third wavelength $\lambda_3$ is generated in the waveguide device 100, and travels along the longitudinal direction of the waveguides toward the opposite longitudinal end of the device. The third wavelength $\lambda_3$ signal is emitted from the longitudinal end of the device.

Figure 3A:
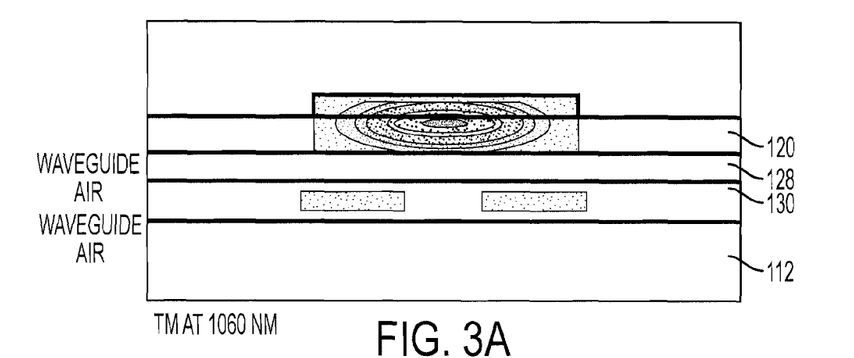
FIG. 3A-3C illustrate the power density distributions of three modes involved in difference frequency generation.
Figure 3B:
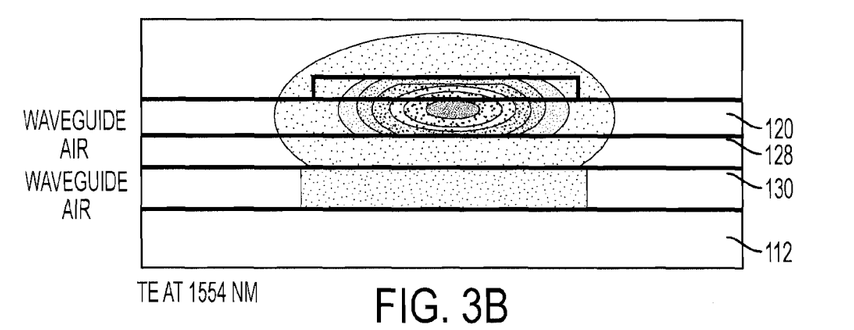
Figure 3C:
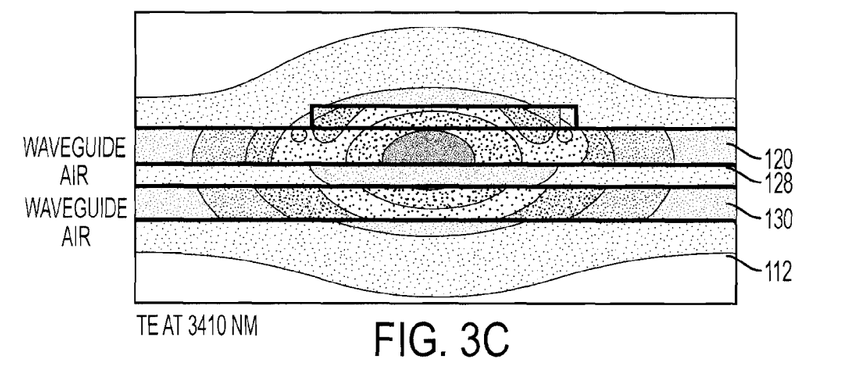

FIG. 3A-3C illustrate the power density distributions of three modes involved in difference frequency generation, as calculated with a Comsol Multiphysics finite element mode solver. FIG. 3A shows the $TM_{00}$ mode at the shorter pump wavelength of 1060 nm, and FIG. 3B shows the $TE_{00}$ mode at the longer pump wavelength of 1554 nm. FIG. 3C shows the $TE_{00}$ mode at the difference frequency mid-IR wavelength of 3410 nm. The $TM_{00}$ mode of the shortest wavelength pump $P_1$ of $\lambda_1=1060$ nm shown in FIG. 3A appears to be significantly wider than the $TE_{00}$ mode of the longer wavelength pump $P_2$ of $\lambda_2=1554$ nm shown in FIG. 3B, but both of these modes are largely confined in the top waveguide under the ridge.

The horizontal nanoslot 128 between the slabs 120, 130 allows some fields to propagate mostly in the higher index AlGaAsP material, while other modes propagate more in the lower refractive index air. For example, the TM mode penetrates the air gap much more than the TE mode, and therefore, the TM mode is less confined than a TE mode and the device is expected to have a substantially lower effective index for the TM modes. As seen in FIG. 3C, the $TE_{00}$ mode of the difference frequency mid-IR wave $\lambda_3=3410$ nm is spread out between two waveguides and is expected to be greatly affected by any changes in the air gap width.

Figure 4:
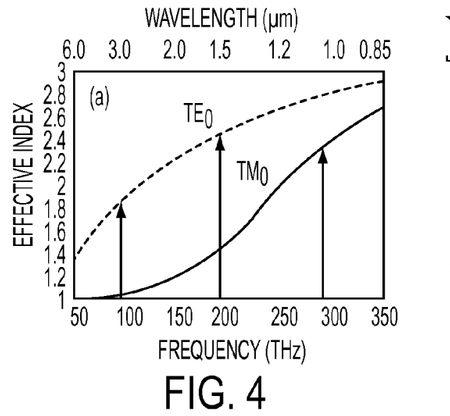
FIG. 4 is a plot of the effective index $n_{eff}$ over a frequency range of 50 THz to 350 THz (wavelength range of 6.0 to 0.85 microns).
Figure 5:
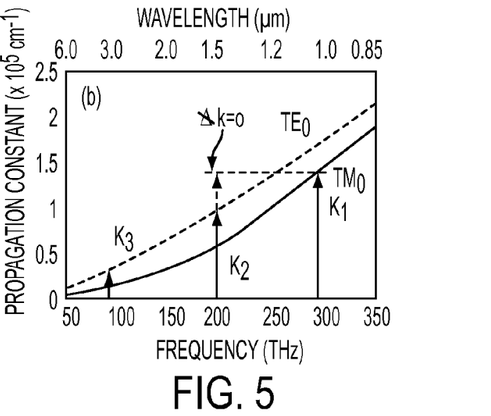
FIG. 5 is a plot of the propagation constant $\beta$ over a frequency range of 50 THz to 350 THz.

To illustrate the extent of the form birefringence attainable in the suspended waveguide, FIG. 4 plots the refractive effective index $n_{eff}$ and FIG. 5 plots the propagation constant $\beta$ for the frequency range spanning most of the near- and mid-IR from 0.85 to 6 microns.

As seen in FIG. 4, a large birefringence $\Delta n$ of about one (1.0) can be achieved at a pump wavelength of approximately 1.5 microns. The one micron pump wavelength is very useful, as it allows pumping by solid state lasers, such as, for example, Nd-YAG lasers. The large $\Delta n=1$ birefringence of the waveguide 100 is estimated to be at least five times as large as the birefringence of waveguides that use oxidized waveguides described in A. Fiore et al., "Second-harmonic generation at $\lambda=1.6$ µm in AlGaAs/Al2O3 waveguides using birefringence phase matching", Appl. Phys. Lett., Vol. 72, pp. 2942-45 (1998) and A. Fiore et al., "Phase-matched mid-infrared difference frequency generation in GaAs-based waveguides", Appl. Phys. Lett., Vol. 71, pp. 3622-24, (1997), although the waveguide 100 uses a single pair of AlGaAsP slabs with one air gap layer between them, whereas the referenced layered oxidized waveguides use three aluminum oxide layers.

FIG. 5 plots the propagation constant $\beta$ versus frequency and wavelength of the two pump waves and one DFG wave, and shows that the phase matching condition $k_1=k_2+k_3$ can be satisfied.

The conversion efficiency (per unit of length) is $$\eta_{DFG} = \frac{8\pi^2 \eta_0 |d_{eff}|^2}{n_1 n_2 n_3 \lambda_3^2 A_{ff}},$$

where $d_{eff}=170$ pm/V is the second order susceptibility $\chi^2$, $\eta_0=377\Omega$, the values $n_i$ are the effective indices of three modes i=1, 2, 3, and the effective DFG cross section is determined by the modes' E(x,y) overlap as $$A_{eff} = \frac{\int nE_1^2 dx dy \int nE_2^2 dx dy \int nE_3^2 dx dy}{n_3 [\int nE_1 E_2 E_3 dx dy]^2},$$

with the integral in the denominator being taken only inside the waveguides.

According to these equations, the effective DFG cross section $A_{eff}$ is approximately 4 square microns (4 μm$^2$), and a conversion efficiency $\eta_{DFG}$ of about 400 W$^{-1}$ cm$^{-2}$ can be obtained, which is much higher than the layered oxide waveguides. The higher conversion efficiency is believed to be due to the much tighter mode confinement of the FIG. 1 nanoslot waveguide. It appears that full conversion is possible within an approximately one mm long waveguide with less than one Watt of input power without being impeded by excessive two-photon absorption, which at these levels would result in an estimated 0.1 cm$^{-1}$ loss.

In a preferred embodiment, the system can be tuned by varying the air gap distance d between the two waveguides. The width of the air gap mostly affects the mid-IR mode $\lambda_3$ and, to a lesser degree, the relatively long $\lambda_2$ mode, while the short wavelength pump in the TE mode is hardly affected. As a result, the phase-matching condition can be tuned.

Figure 6:
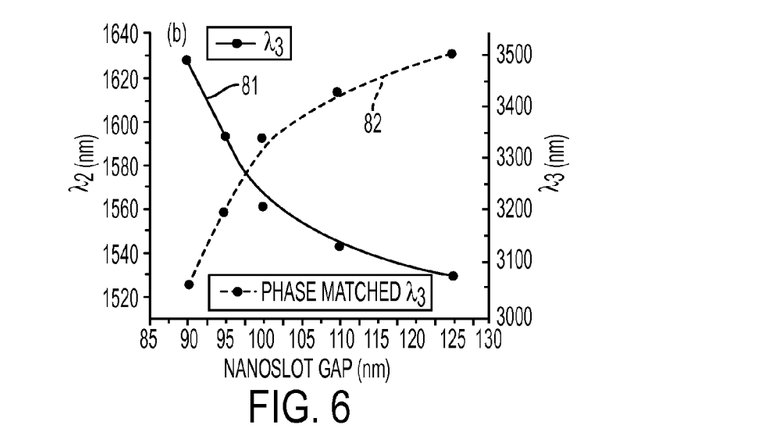
FIG. 6 plots the phase pump wavelength $\lambda_2$ and the phase matched DFG wavelength $\lambda_3$ versus nanoslot gap distance for a nanoslot waveguide device with a constant pump wavelength $\lambda_1$ of 1.06 nm.

FIG. 6 illustrates operation of a nanoslot waveguide with a constant pump wavelength $\lambda_1$ of 1.06 nm. The curve 81 shows the second pump wavelength $\lambda_2$ that would result in an output DFG wavelength $\lambda_3$ (curve 82) when the nanoslot is at a particular gap distance. For example, when the nanoslot gap is 95 nm, a phase matched pump wavelength $\lambda_2$ of about 1590 nm is expected to produce a DFG wavelength $\lambda_3$ of about 3210 nm. When the nanoslot gap is about 110 nm, a phase matched pump wavelength $\lambda_2$ of about 1540 nm will produce a DFG wavelength $\lambda_3$ of about 3440 nm.

Figure 7:
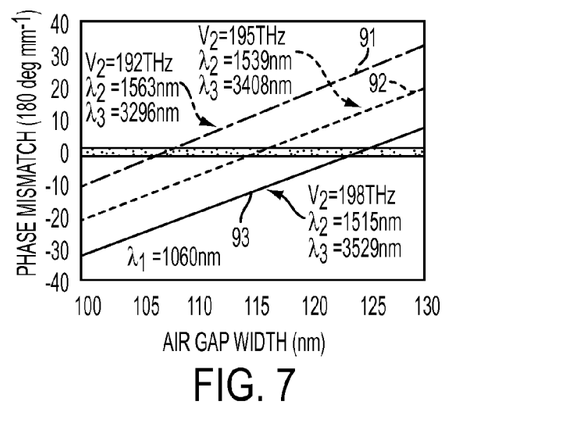
FIG. 7 shows plots of the phase mismatch versus air gap width for different wavelengths $\lambda_2$ and a constant wavelength $\lambda_1$ of 1060 nm.

FIG. 7 illustrates phase matching curves 91, 92, and 93 as plots of the phase mismatch versus air gap width for different wavelengths $\lambda_2$ and a constant wavelength $\lambda_1$ of 1060 nm. The horizontal lines indicate the phase matching range for a one millimeter long waveguide. By varying the gap width between 100 and 130 nm, tunability in excess of 10 THz (330 cm$^{-1}$) can be achieved, which can cover the DFG wavelength ($\lambda_3$) range from 3.2 to 3.6 microns.

Figure 8:
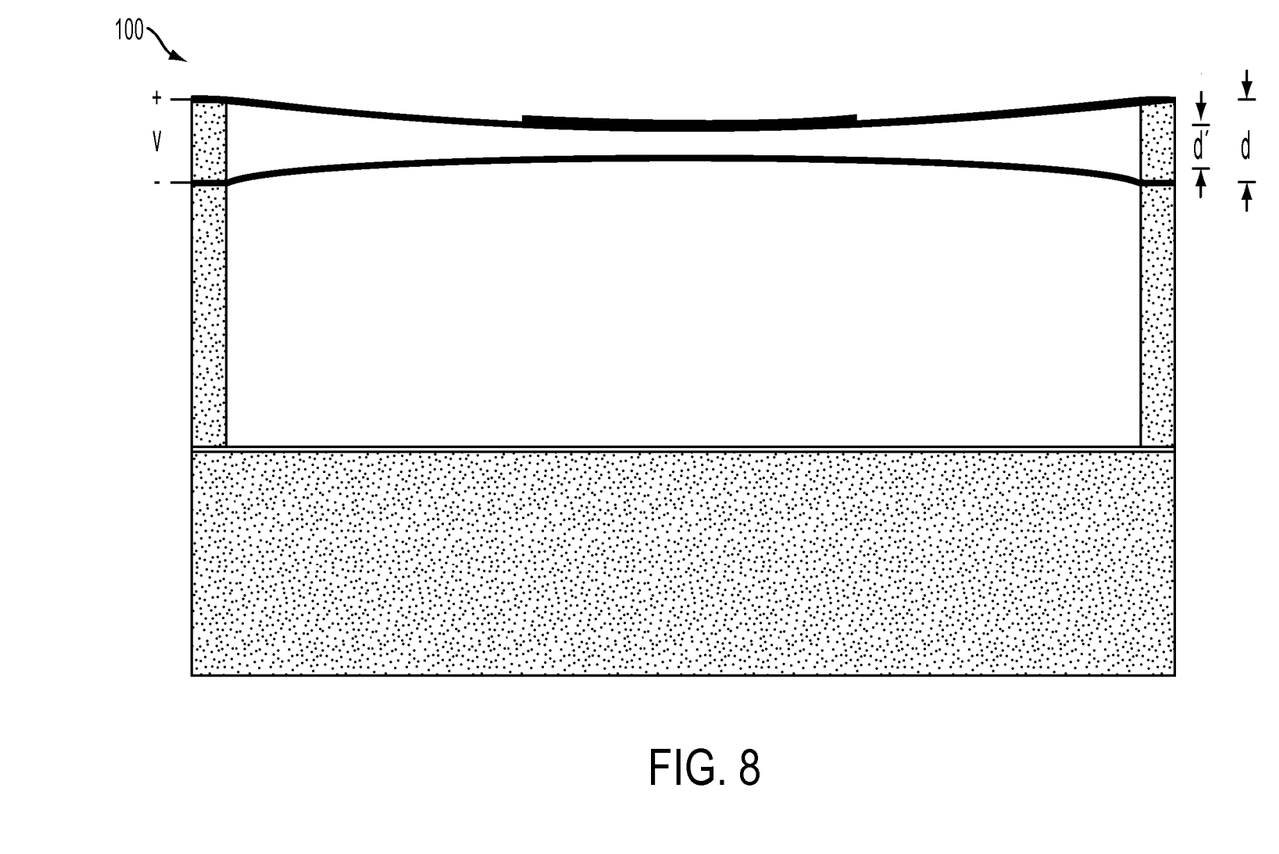
FIG. 8 shows electrostatic actuation of the n- and p-doped waveguide slabs.

Tuning of the gap width can be achieved using electrostatic actuation of suspended air-clad waveguides. One way to electrostatically actuate the waveguides is to lightly p-dope the bottom slab, leave the GaAs sacrificial layer undoped, and lightly n-dope the top slab. As shown in FIG. 8, during operation, applying a reverse bias of a few volts across the resulting p-i-n diode formed by the doped slabs, can cause change of up to one third of the original gap distance. Low doping concentrations should not add additional propagation loss to the waveguide.

The examples shown above illustrate AlGaAsP waveguide slabs and a GaAs substrate. The device can also be formed with other III-V semiconductor materials with large second order nonlinear susceptibilities ($\chi^2$). For example, InGaAs, InGaAsP, InAlAs, InP, AlAs, or AlGaAsP can form the waveguides and GaP, InP, GaSb, or GaAs can form the substrates.

In operation, the optical waveguide device is a frequency mixer, difference frequency generator (DFG), sum frequency generator (SFG), or second harmonic generator (SHG), and can be very useful in the mid-IR range. The device can be incorporated as part of a laser system, or external to a laser source.

The waveguide devices described herein can be arranged as part of a laser device or external to a laser device. The waveguide device can be arranged within an optically resonant cavity, as part of an optical parametric oscillation system. The waveguide device stimulates emission of photons at the difference frequency generation wavelength, which are amplified by the resonant cavity.

Figure 9A:
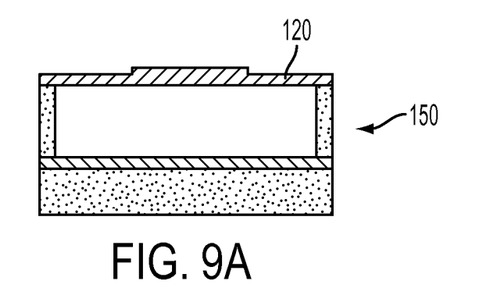
FIGS. 9A and 9B illustrate a low-loss suspended waveguide device with a single suspended waveguide.
Figure 9B:
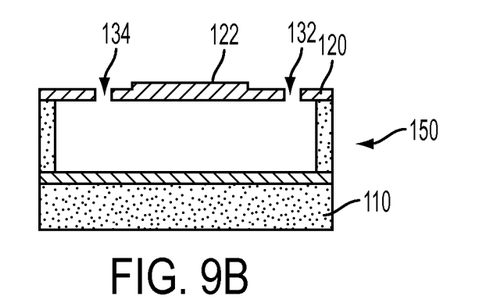

The waveguide device can also be configured with some variations. For example, a waveguide device in accordance with an embodiment of the invention shown in FIGS. 9A and 9B includes only the top waveguide slab 120 suspended over the substrate 110 without the bottom waveguide slab 130 of FIG. 1A-1C. The top waveguide slab 120 includes etch holes 132 and 134, as well a ridge 122 as shown in FIG. 1A above, or a rib with more height than the ridge 122. Such a one-waveguide configuration would not be tunable over different frequency ranges but would still enable birefringent phase matching with efficiencies similar to the suspended nanoslot waveguide of FIG. 1A-1C.

The waveguides shown herein are shown as extending across the lateral direction to the support elements. It is also suitable to include the high nonlinear susceptibility material (e.g., the AlGaAsP) across only the center portion of the waveguide slabs, with a different material between the lateral supports and the high nonlinear susceptibility material.

The waveguide can also be configured with more than two waveguide slabs, with horizontal nanoslots between each pair of slabs.

The suspended slotted waveguide device combines microelectromechanical actuation, semiconductor nanofabrication, and birefringent phase matching to achieve high conversion efficiencie over a large optical bandwidth.

The suspended nanoslot waveguide devices described herein can have several advantages over QPM approaches or other BPM devices with nonlinear wavelength conversion.

For example, QPM waveguides appear to be inherently lossier than waveguides based on birefringent phase matching in III-V semiconductor waveguides. The QPM approaches involve the periodic domain reversal of the crystal along the length of the waveguide. Thus, the numerous interfaces spaced at every few tens of microns along the waveguide should be perfectly smooth and free of dislocations to minimize scattering and waveguide loss. In addition, most current QPM approaches are based on the ferroelectric oxides (e.g., lithium niobate). Lithium niobate is only transparent in a range from the visible to about 4 microns, whereas AlGaAs is transparent over a range from the visible to over 15 microns.

The suspended rib waveguide devices are easier to manufacture with precise control over the slab thickness, have very smooth slab surfaces, and have a large index contrast for strong mode confinement.

High conversion efficiency is predicted based on two factors. First, the modal $A_{eff}$ can be made very small (e.g., a few square microns), which is at least an order of magnitude smaller than the effective area of PPLN or OP-GaAs waveguides. The nonlinear conversion efficiency is inversely proportional to the $A_{eff}$. Second, GaAs/AlGaAs has an approximately ten times larger nonlinear susceptibility than LiNbO3 used in a PPLN device.

It is also noted that the tunability provided by the electrostatic actuation of the suspended waveguides is very beneficial for applications that require wavelength agility, such as spectroscopy and molecular sensing. Alternative approaches that use QPM or a single slab/ridge waveguides are only tunable with temperature, which is fundamentally more limited in tuning range.

The invention has been described with reference to certain preferred embodiments. It will be understood, however, that the invention is not limited to the preferred embodiments discussed above, and that modification and variations are possible within the scope of the appended claims.

What is claimed as new and desired to be protected by Letters Patent of the United States is:

1. An birefringent phase matching optical semiconductor device for frequency mixing or conversion comprising:
    a substrate;
    a first waveguide slab suspended at opposite ends of the slabs at a first distance from the substrate; and
    a second waveguide slab suspended at opposite ends at a second distance from the substrate, the second waveguide slab parallel to and spaced apart from the first waveguide slab, the first waveguide slab and the second waveguide formed of a type III-V semiconductor material,
    wherein the first waveguide slab has a thickness in a direction perpendicular to a face of the waveguide slab, and a width in a direction parallel to a face of the waveguide slab, wherein said first waveguide thickness is less than said first waveguide width, and wherein the second waveguide slab has a thickness in a direction perpendicular to a face of the waveguide, and a width in a direction parallel to a face of the waveguide, wherein said second waveguide slab thickness is less than said second waveguide width.

2. The device according to claim 1, wherein an air gap is located between parallel faces of the first waveguide slab and the second waveguide slab.

3. The device according to claim 2, wherein an air gap is located between the second waveguide slab and the substrate.

4. The device according to claim 1, wherein the first waveguide slab has a thickness in a direction perpendicular to a face of the waveguide slab, and a width in a direction parallel to a face of the waveguide slab, wherein said first waveguide thickness is less than said first waveguide width, and
    wherein the second waveguide slab has a thickness in a direction perpendicular to a face of the waveguide, and a width in a direction parallel to a face of the waveguide, wherein said second waveguide slab thickness is less than said second waveguide slab width.

5. The device according to claim 1, wherein the first waveguide and the second waveguide comprise AlGaAsP.

6. The device according to claim 5, wherein the substrate comprises GaAs.

7. The device according to claim 1, further comprising support elements arranged between the first waveguide slab and the second waveguide slab, and support elements arranged between the second waveguide slab and the substrate at each lateral end of the waveguide slabs.

8. The device according to claim 1, wherein the first waveguide slab is n-doped or p-doped and the second waveguide slab is doped oppositely to the first waveguide slab.

9. The device according to claim 8, wherein in operation, responsive to a voltage applied across the waveguide slabs, the distance between the first waveguide slab and the second waveguide slab decreases.

10. The device according to claim 1, wherein the first waveguide slab includes a longitudinal ridge on the top surface of the first waveguide slab extending in the longitudinal direction.

11. The device according to claim 10, wherein the ridge has a width in a lateral direction at least as wide as its height in a vertical direction.

12. The device according to claim 1, wherein the first waveguide slab and the second waveguide slab include at least one opening extending through the waveguide slabs for etching solution.

13. The device according to claim 12, wherein the first waveguide slab and the second waveguide slab include a plurality of openings on the slabs at both lateral sides of the ridge, the openings extending through both of the waveguide slabs.

14. A birefringent phase matching optical semiconductor device for receiving at least one optical signal at a first wavelength and generating a second optical signal at a second wavelength, the device comprising:
    an n-doped first waveguide slab formed of a type III-V semiconductor material, the first waveguide slab having a thickness much less than its length and much less than its width; and
    a p-doped second waveguide slab formed of a type III-V material, the second waveguide slab arranged parallel to the first waveguide slab, the second waveguide having a thickness much less than its length and much less than its width,
    the waveguide slabs being supported at each end by a support element arranged at lateral ends of the waveguide slabs, wherein said support elements are formed of a material having a low nonlinear susceptibility,
    a center portion of the first waveguide slab being separated from a center portion of the second waveguide slab by a cavity.

15. A method for generating an output optical signal with a birefringent phase matched frequency conversion optical waveguide device, the optical waveguide device having a first waveguide slab formed of a material having a high nonlinear susceptibility, a second waveguide slab formed of a material having a high nonlinear susceptibility, the second waveguide slab arranged parallel to the first waveguide slab, each of the waveguides having a smaller thickness dimension than width dimension, the waveguide slabs being supported at each end by a support element arranged at lateral ends of the waveguide slabs, a center portion of the first waveguide slab being separated from a center portion of the second waveguide slab by a cavity, the method comprising:
    receiving a first optical signal at a first wavelength at an end of the waveguide slabs;
    receiving a second optical signal at a second wavelength at the end of the waveguide slabs;
    optically mixing the first optical signal and the second optical signal to produce an output optical signal at a different wavelength at an opposite end of the waveguide slabs.

16. The method according to claim 15, wherein the first waveguide slab is n-doped, the second waveguide slab is p-doped, the method also comprising:
    changing the distance between the first waveguide slab and the second waveguide slab by applying a voltage between the first waveguide slab and the second waveguide slab to electrostatically actuate the waveguide slabs.

17. The method according to claim 15, wherein the waveguides are formed of type III-V semiconductor material.

18. The method according to claim 15, wherein the waveguides are formed of AlGaAs.

19. The method according to claim 15, wherein the first optical signal and the second optical signals are laser signals.

20. The method according to claim 15, wherein said output optical signal has a frequency approximately equal to the sum of the first optical signal frequency and the second optical frequency signal.

21. The method according to claim 15, wherein said output optical signal has a frequency approximately equal to the difference between the first optical signal frequency and the second optical frequency signal.

22. The method according to claim 15, wherein the output optical signal has a wavelength between three and four microns.

23. The method according to claim 15, wherein the first optical signal is about 1.064 nm and the second optical signal is about 1.55 nm.

24. The method according to claim 15, wherein the waveguide device has a semiconductor substrate spaced apart from the first and second waveguide slabs by an air gap.

25. The method according to claim 15, wherein said first waveguide slab has a ridge on at least one face extending in a longitudinal direction, wherein said ridge is wider than a thickness of said first waveguide slab and said ridge is wider than a distance between the first and second waveguide slabs.

26. The method according to claim 15, further comprising:
   applying a voltage between the first waveguide slab and the second waveguide slab.

\* \* \* \* \*

UNITED STATES PATENT AND TRADEMARK OFFICE
CERTIFICATE OF CORRECTION

| | |
|---|---|
| PATENT NO. | : 8,427,738 B2 |
| APPLICATION NO. | : 12/901159 |
| DATED | : April 23, 2013 |
| INVENTOR(S) | : Todd H. Stievater et al. |

It is certified that error appears in the above-identified patent and that said Letters Patent is hereby corrected as shown below:

On the title page, item (74) should read

Attorney, Agent, or Firm - Amy L. Ressing, Sally A. Ferrett

Signed and Sealed this
Thirtieth Day of June, 2015

Michelle K. Lee
*Director of the United States Patent and Trademark Office*